(12) United States Patent
Dolker et al.

(10) Patent No.: US 7,352,072 B2
(45) Date of Patent: Apr. 1, 2008

(54) METHOD FOR THE CLOSED-LOOP SPEED CONTROL OF AN INTERNAL COMBUSTION ENGINE-GENERATOR UNIT

(75) Inventors: Armin Dolker, Immenstaad (DE); Klaus Schafer, Oberteuringen (DE)

(73) Assignee: MTU Friedfrichshafen GmbH, Friedrichshafen (DE)

( * ) Notice: Subject to any disclaimer, the term of this patent is extended or adjusted under 35 U.S.C. 154(b) by 183 days.

(21) Appl. No.: 11/127,532

(22) Filed: May 11, 2005

(65) Prior Publication Data
US 2005/0253394 A1   Nov. 17, 2005

(30) Foreign Application Priority Data
May 14, 2004   (DE) .................. 10 2004 023 993

(51) Int. Cl.
*B60L 90/02* (2006.01)
*F02N 11/00* (2006.01)
*F02P 9/00* (2006.01)

(52) U.S. Cl. .................. 290/30 A; 123/179.3

(58) Field of Classification Search .............. 290/30 A, 290/31; 123/179.3, 179.4, 179.28, 352
See application file for complete search history.

(56) References Cited

U.S. PATENT DOCUMENTS

| | | | |
|---|---|---|---|
| 5,577,474 A * | 11/1996 | Livshiz et al. | 123/352 |
| 6,873,941 B2 | 3/2005 | Doekler | |
| 7,028,657 B2 * | 4/2006 | Sah et al. | 123/179.3 |
| 7,072,759 B2 * | 7/2006 | Dolker | 123/352 |
| 2002/0195084 A1* | 12/2002 | Denz et al. | 123/350 |
| 2004/0079329 A1* | 4/2004 | Doelker | 123/339.21 |
| 2005/0279324 A1* | 12/2005 | Dolker | 123/352 |
| 2006/0278191 A1* | 12/2006 | Dolker | 123/179.3 |

FOREIGN PATENT DOCUMENTS

| | | |
|---|---|---|
| DE | 10122517 | 6/2002 |
| DE | 103 15 881 A1 | 11/2004 |

* cited by examiner

*Primary Examiner*—Noah P. Kamen
*Assistant Examiner*—Arnold Castro
(74) *Attorney, Agent, or Firm*—Klaus P. Stoffel; Wolff & Samson PC

(57) ABSTRACT

A method for the closed-loop speed control of an internal combustion engine-generator unit with a coupling, in which method, when the engagement of the coupling is detected, a change is made from a first set of parameters to a second set of parameters. In the second set of parameters, a second run-up ramp is set, which determines the presetting of the set speed, and second controller parameters are set as the determining factors for computing controller components of a speed controller.

10 Claims, 5 Drawing Sheets

METHOD FOR THE CLOSED-LOOP SPEED CONTROL OF AN INTERNAL COMBUSTION ENGINE-GENERATOR UNIT

BACKGROUND OF THE INVENTION

The invention concerns a method for the closed-loop speed control of an internal combustion engine-generator unit.

Emergency standby installations are started in an uncoupled state when the public power supply system fails and are coupled with the generator, at the latest, when a rated speed is attained. A system of this type will be referred to hereinafter as an internal combustion engine-generator unit. In the case of electromagnetic couplings, the coupling process is initiated by a coupling signal. Couplings of this type usually already engage during the run-up of the internal combustion engine.

When the coupling engages, the total moment of inertia of the system experiences a sharp change. The internal combustion engine has a moment of inertia of about 20 kgm2. The generator with induction coupling has a moment of inertia of about 360 kgm2. After the power failure, the induction coupling supplies the necessary energy to the system until the internal combustion engine becomes available. The induction coupling thus represents an energy storage device. After the coupling engages, the induction coupling and the generator are driven by the internal combustion engine.

The internal combustion engine is delivered to the customer with a fixed standard set of parameters. This standard set of parameters must guarantee stable behavior for operation both with and without generator and induction coupling. Automatic control of the internal combustion engine is most difficult when the engine is uncoupled, i.e., the stability reserve is then at its lowest. Consequently, the standard set of parameters must be designed for the uncoupled case. This means that the internal combustion engine may be delivered with only a very small proportional coefficient and, if at all possible, without a D component. For all internal combustion engines that are operated with a generator, this means a loss of dynamic range. In the case of internal combustion engines that power systems with a very large moment of inertia, this is unsatisfactory.

The not previously published German patent application with the official file number DE 103 15 881.2 describes a method for the closed-loop speed control of an internal combustion engine-generator unit during a starting operation. In this method, a run-up ramp is selected as a function of a measured time interval to preset a set speed. Controller parameters for the determination of controller components of a speed controller are also selected as a function of this time interval. A proportional coefficient and an integral-action time are specified as controller parameters. The time interval corresponds to the time that an actual speed requires to pass through a speed range. The speed range begins at a starter speed, e.g., 300 rpm, and ends at a starting speed, e.g., 600 rpm. The method has proven effective in practice. However, it is critical that the parameters have already been established at the start of the run-up ramp. For the aforementioned example of a coupling that does not engage until during the run-up of the engine, this means that the starting operation is not being operated with the optimum parameters.

SUMMARY OF THE INVENTION

The object of the present invention is to further develop the aforementioned method for automatically controlling an internal combustion engine-generator unit with respect to the engaging of the coupling during the run-up of the engine.

The invention provides that, during the starting operation, after the start of the first run-up ramp, a second set of parameters is selected when it is detected that the coupling has engaged, and the first set of parameters is deactivated. The second set of parameters is used to set a second run-up ramp, which determines the presetting of the set speed. In addition, second controller parameters are set as the determining means for computing controller components of the speed controller. Alternatively, the engagement of the coupling can also be detected from a gradient change of the engine speed during the run-up of the engine. The second set of parameters defines a second run-up ramp which has a smaller slope than the first run-up ramp of the first set of parameters. A second proportional coefficient, a second rate-action time, and a second integral-action time are defined as controller parameters by means of the second set of parameters. They have higher values than the controller parameters of the first set of parameters.

The invention offers the important advantage that a best possible set of parameters is used for the starting operation with the coupling both disengaged and engaged. The method of the invention can be subsequently applied in an electronic engine-control unit. No hardware changes are necessary. Therefore, the extra costs are small.

Other features and advantages of the present invention will become apparent from the following description of the invention that refers to the accompanying drawings.

DETAILED DESCRIPTION OF THE INVENTION

Figure 1:
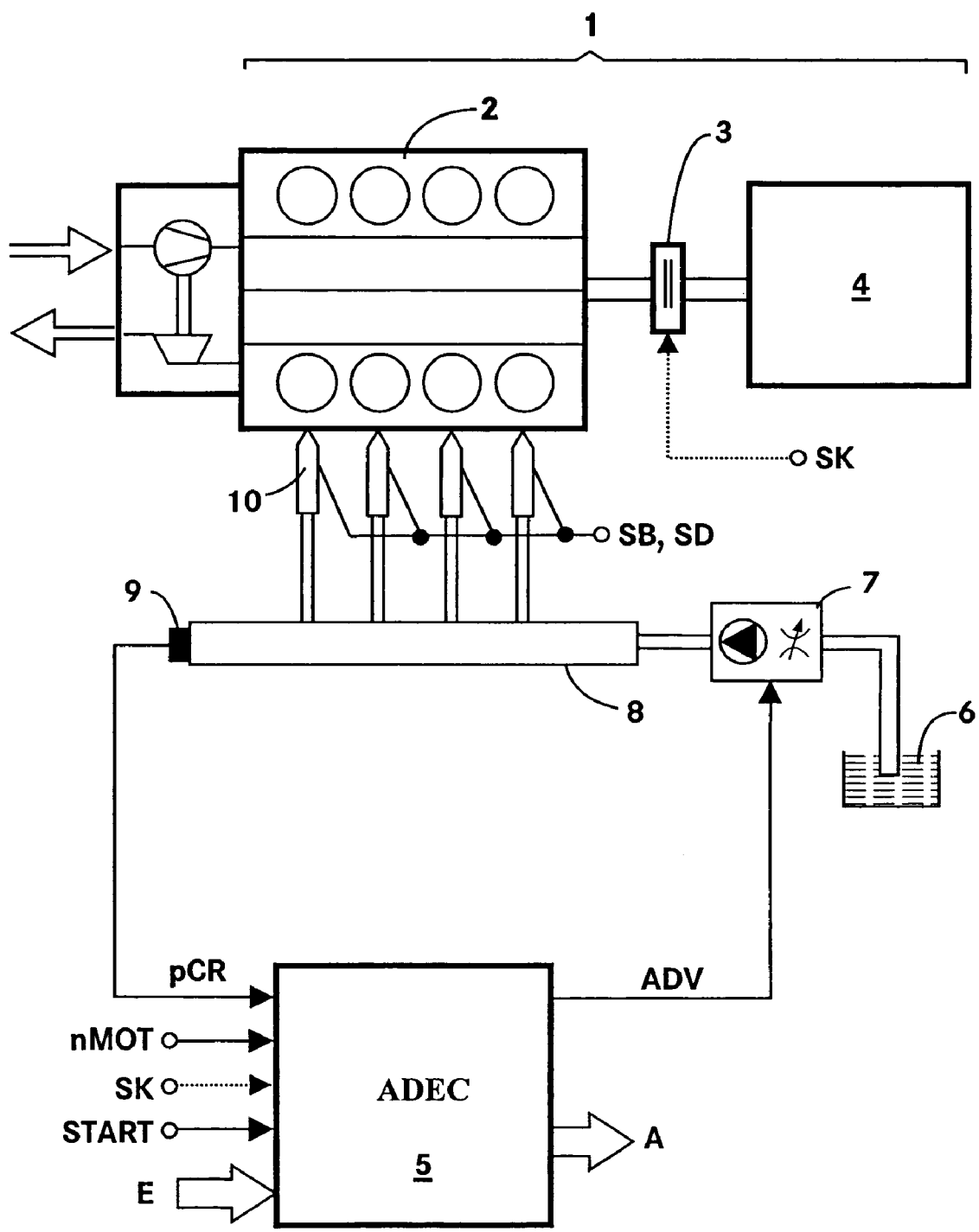
FIG. 1 shows a system diagram.

FIG. 1 shows a system diagram of the total system of an internal combustion engine-generator unit 1. An internal combustion engine 2 drives a generator 4 via a shaft. In the illustrated internal combustion engine 2, the fuel is injected by a common-rail injection system. This injection system comprises the following components: pumps 7 with a suction throttle for conveying the fuel from a fuel tank 6, a rail 8 for storing the fuel, and injectors 10 for injecting the fuel from the rail 8 into the combustion chambers of the internal combustion engine 2.

The operation of the internal combustion engine 2 is automatically controlled by an electronic control unit (ADEC) 5. The electronic control unit 5 contains the usual components of a microcomputer system, for example, a microprocessor, interface adapters, buffers, and memory components (EEPROM, RAM). The relevant operating characteristics for the operation of the internal combustion engine 2 are applied in the memory components in input-output maps/characteristic curves. The electronic control unit 5 uses these to compute the output variables from input variables. FIG. 1 shows the following input variables as examples: an actual rail pressure pCR, which is measured by means of a rail pressure sensor 9, a speed signal nMOT of the internal combustion engine 2, an input variable E, and a signal START for the start set-point assignment. The start set point assignment is activated by the operator. Examples of input variables E are the charge air pressure of a turbocharger and the temperatures of the coolant/lubricant and the fuel.

As output variables of the electronic control unit 5, FIG. 1 shows a signal ADV for controlling the pumps 7 with a suction throttle and an output variable A. The output variable A is representative of the other control signals for automatically controlling the internal combustion engine 2, for example, the injection start SB and the injection time SD.

When the public power supply system fails, an internal combustion engine-generator unit is started in an uncoupled state. At the latest, when a rated speed has been attained, the generator 4 is frictionally engaged with the internal combustion engine 2 by a coupling 3. In the case of an electromagnetic coupling, the coupling process is initiated by a coupling signal. This coupling signal SK is preset by the operator. This coupling is usually already completed during the run-up. When an electromagnetic coupling is used, the electronic control unit 5 is supplied with the coupling signal SK as an additional input variable.

Figure 2:
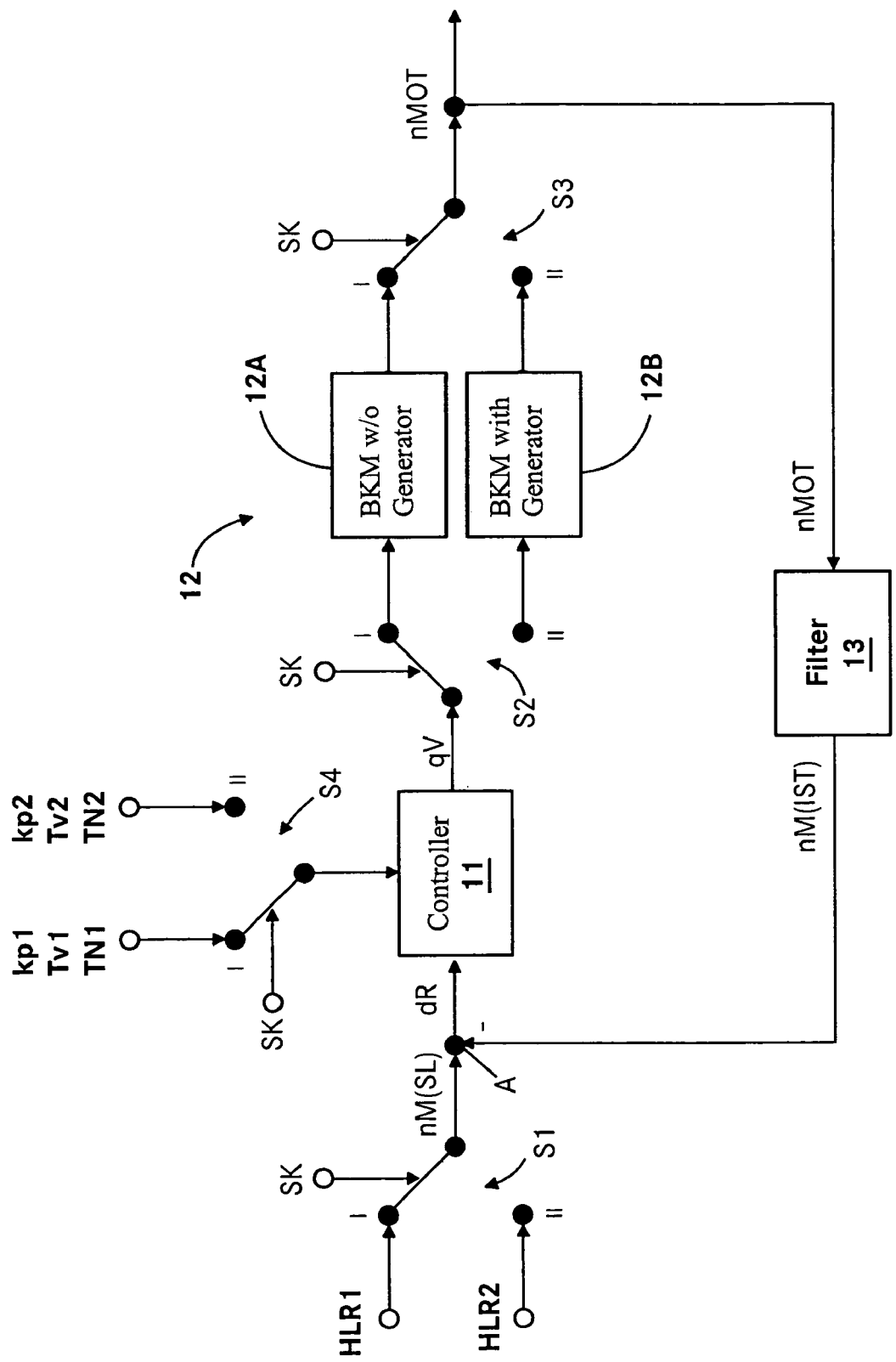
FIG. 2 shows a closed-loop speed control system.

FIG. 2 shows a closed-loop speed control system, which comprises a speed controller 11, a controlled system 12, and a filter 13 in the feedback path. FIG. 2 shows two examples of the controlled system 12. Reference symbol 12A is used to designate an internal combustion engine without a generator as the controlled system, while reference symbol 12B is used to designate an internal combustion engine with a generator as the controlled system. In this closed-loop speed control system, the engine speed nMOT is measured, e.g., on the crankshaft. The raw values of this engine speed nMOT are converted to an actual speed nM(IST) by the filter 13. A speed filter of this type is described, for example, in DE 101 22 517 C1. At a summing point A, a set speed nM(SL) is compared with the actual speed nM(IST). This yields a control deviation dR. The speed controller 11 computes a correcting variable qV as a function of this control deviation dR, and the correcting variable qV acts on the controlled system 12. The speed controller 11 usually contains a P component, an I component, and a D component as controller components.

In addition to the closed-loop speed control system, FIG. 2 shows four switches S1 to S4. The switch position I illustrated in the drawing corresponds to a starting operation in which the internal combustion engine 2 is started without a generator. In this configuration, a first set of parameters PARA1 is activated. This first set of parameters is used to define a first run-up ramp HLR1 for presetting the set speed nM(SL) and first controller parameters for computing the controller components of the speed controller 11. The controller parameters correspond to a first proportional coefficient kp1 for computing the P component, a first rate-action time Tv1 for computing the D component, and a first integral-action time TN1 for computing the I component. When engagement of the coupling 3 is detected after the start of the first run-up ramp HLR1, a switch is made to the second set of parameters PARA2. In FIG. 2, this corresponds to the switching of switches S1 to S4 into position II. In this example, the engagement of the coupling and the resulting change in switch position is initiated by the signal SK. The second set of parameters PARA2 is used to set a second run-up ramp HLR2, which determines the presetting of the set speed nM(SL). At the same time, second controller parameters are set by the change in the switch S4 as the determining means for computing the controller components. The speed controller 11 then computes its controller components on the basis of a second proportional coefficient kp2, a second rate-action time Tv2, and a second integral-action time TN2. The second run-up ramp HLR2 defined in the second set of parameters PARA2 has a smaller slope than the first run-up ramp HLR1 of the first set of parameters PARA1. In practice, a value of 800 1/(minute×second) has been found to be effective for the first run-up ramp HLR1, and a value of 100 1/(minute×second) has been found to be effective for the second run-up ramp HLR2.

In FIG. 3, a first embodiment of a starting operation for an internal combustion engine-generator unit is shown in the form of a time diagram. In this embodiment, the coupling signal SK for the coupling is generated by the operator. FIG. 3 consists of five parts, FIGS. 3A to 3E, which show, as a function of time in each case: the coupling signal SK (FIG. 3A), the engine speed nMOT (FIG. 3B), the proportional coefficient kp in Nm min (FIG. 3C), the integral-action time TN in seconds (FIG. 3D), and the rate-action time Tv in seconds (FIG. 3E).

A starting operation for an internal combustion engine-generator unit proceeds as follows:

After the start button has been pushed at time t1, the starter engages, and the internal combustion engine starts to turn. At time t1, the first set of parameters PARA1 is activated. The first run-up ramp HLR1 is defined by the first set of parameters PARA1 and has, for example, a value of 800 1/(minute×second). A first proportional coefficient kp1 of 0.8, an integral-action time of 0.4 and a rate-action time of zero seconds are defined in the first set of parameters PARA1. Starting at time t1, the actual speed nM(IST) increases up to a starter speed nAN of, e.g., 120 rpm, time t2. At the end of the synchronization process at time t3, fuel is injected into the combustion chambers. At the same time, the starter is deactivated, so that it disengages. Due to the injection, the actual speed nM(IST) increases until it exceeds a starting speed nST at point A and time t4. Starting at time t4, the set speed nM(SL) corresponding to the first run-up ramp HLR1 is preset for the closed-loop speed control system. The actual speed nM(IST) follows the set speed nM(SL). At time t5, the coupling signal SK of the coupling is set, i.e., value 1. When the coupling signal is set, a switch is made from the first set of parameters PARA1 to the second set of parameters PARA2. The second set of parameters PARA2 contains the second run-up ramp HLR2 and the second controller parameters. Starting at time t5, the second run-up ramp HLR2 starts to run at point B. The second run-up ramp HLR2 has a smaller slope than the first run-up ramp HLR1, e.g., 100 1/(minute×second). The signal kp changes to a value of 4.5 at time t5. The integral-action time TN is set to a value of 1.5, and the rate-action time Tv is set to a value of 0.1. At time t6, the actual speed nM(IST) exceeds a rated speed nNN at point C. In the case of a 50-Hz generator, the rated speed nNN corresponds to a speed value of 1,500 rpm. Starting at time t6, the set speed nM(SL) is set to the value of the rated speed nNN, i.e., the second run-up ramp HLR2 is terminated. At time t7, the coupling signal SK for the coupling is set back to zero by the operator. Starting at this time, the second set of parameters PARA2 is deactivated, and the first set of parameters PARA1 is reactivated, i.e., the controller parameters are set back to the original values.

Figure 3A:
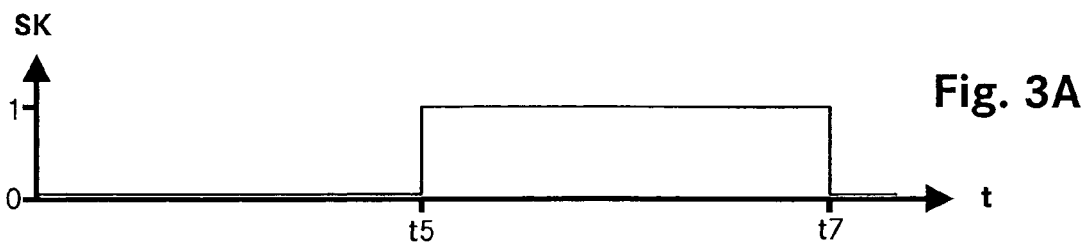
FIG. 3 shows a time diagram of a first embodiment.
Figure 3B:
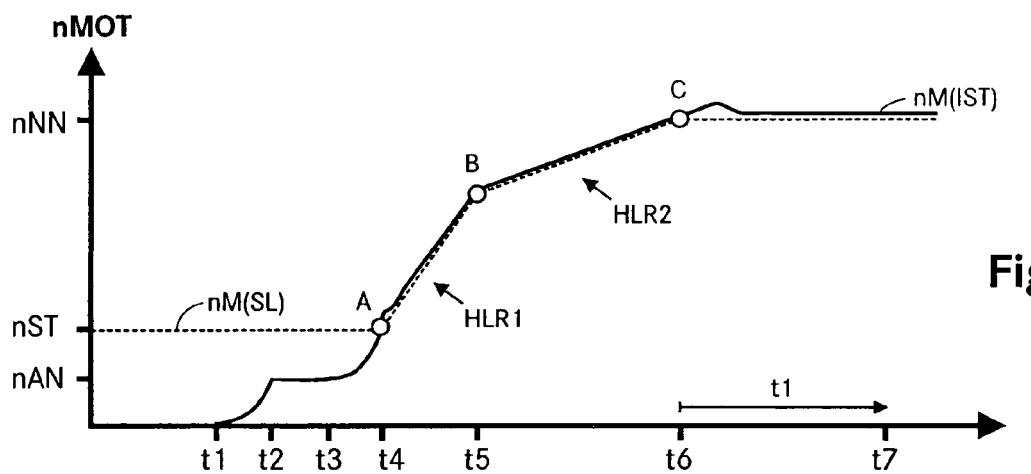
Figure 3C:
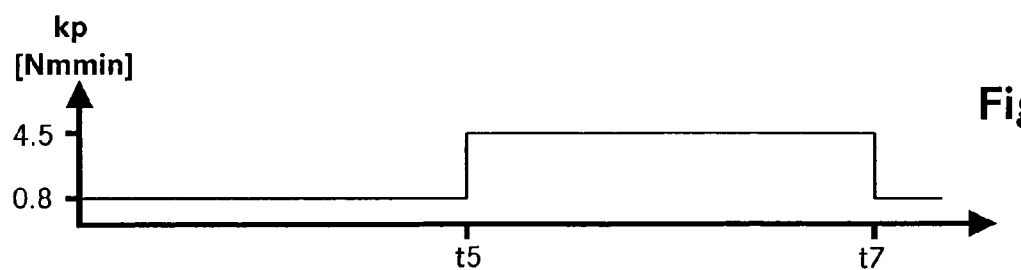
Figure 3D:
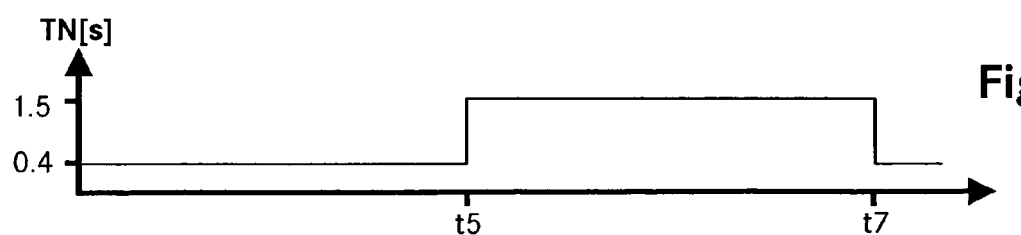
Figure 3E:
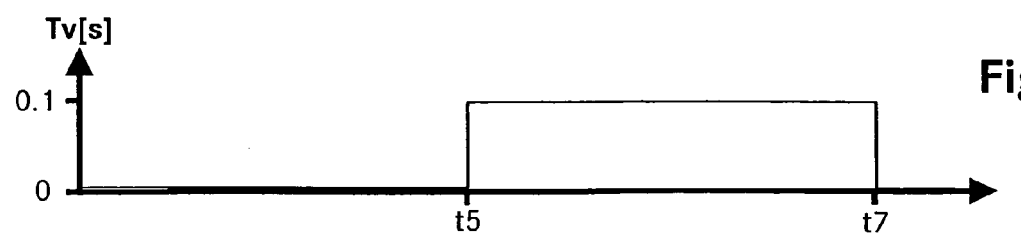
Figure 4A:
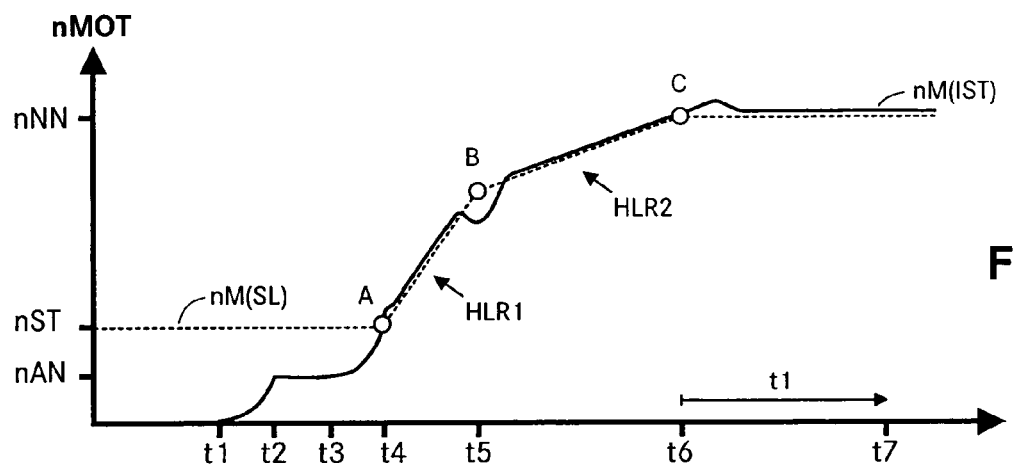
FIG. 4 shows a time diagram of a second embodiment.
Figure 4B:
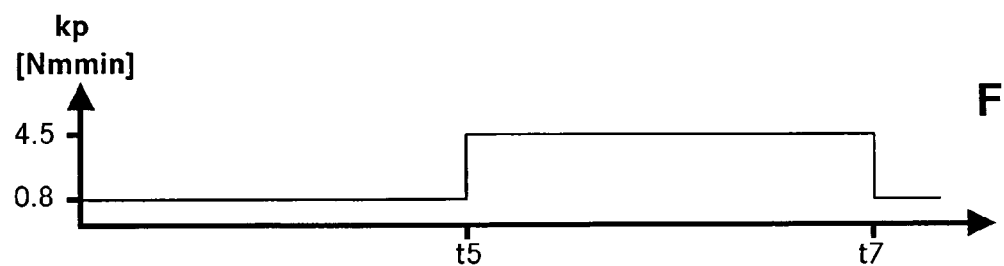
Figure 4C:
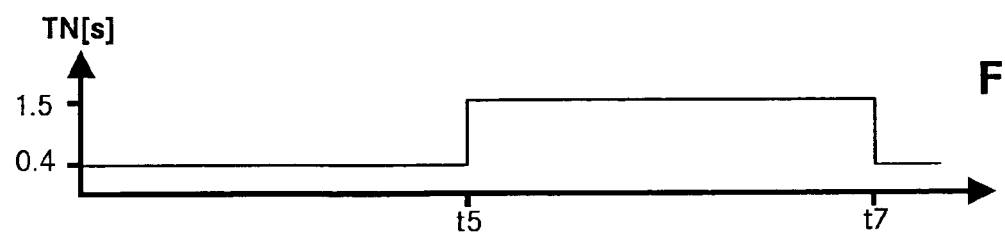
Figure 4D:
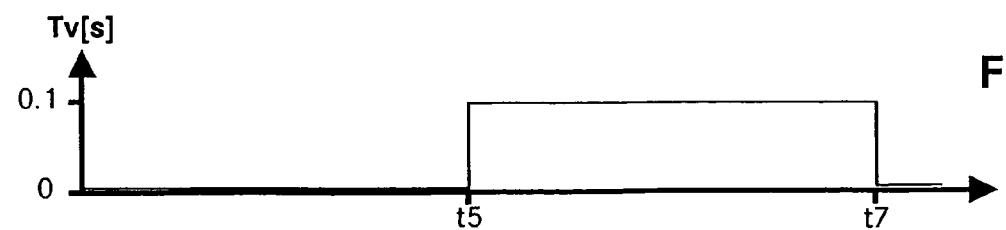

In FIG. 3B, a time interval t1 is shown as an alternative to resetting the coupling signal SK. This time interval t1 begins at time t6 and ends, for example, at time t7. After the time interval t1 has elapsed, a switch is likewise made from the second set of parameters PARA2 back to the first set of parameters PARA1.

In FIG. 4, a second embodiment of a starting operation for an internal combustion engine-generator unit is shown in the form of a time diagram. In this second embodiment, engagement of the coupling is detected by the gradient of the actual speed nM(IST). Alternatively, of course, it is also possible to derive engagement of the coupling from the control deviation dR. FIG. 4 consists of four parts, FIGS. 4A to 4D, which show, as a function of time in each case: the engine speed nMOT (FIG. 4A), the proportional coefficient kp in Nm min (FIG. 4B), the integral-action time TN in seconds (FIG. 4C), and the rate-action time Tv in seconds (FIG. 4D).

The method in accordance with FIG. 4 proceeds in exactly the same way with respect to time as the method in accordance with FIG. 3 until time t5. At time t5, the coupling engages. This causes the actual speed nM(IST) to drop. The engagement of the coupling is detected on the basis of the change in gradient of the actual speed nM(IST). When the engagement of the coupling is detected, a switch is made from the first set of parameters PARA1 to the second set of parameters PARA2. This causes the second run-up ramp HLR2 to be set as the determining factor for the set point assignment of the set speed nM(SL), and at the same time, the second controller parameters kp2, TN2, and Tv2 are set, i.e., point B. This causes their values to increase according to the graphs in FIGS. 4B to 4D. The method then continues in the same way as in FIG. 3, so that the discussion in connection with FIG. 3 also applies here.

Figure 5:
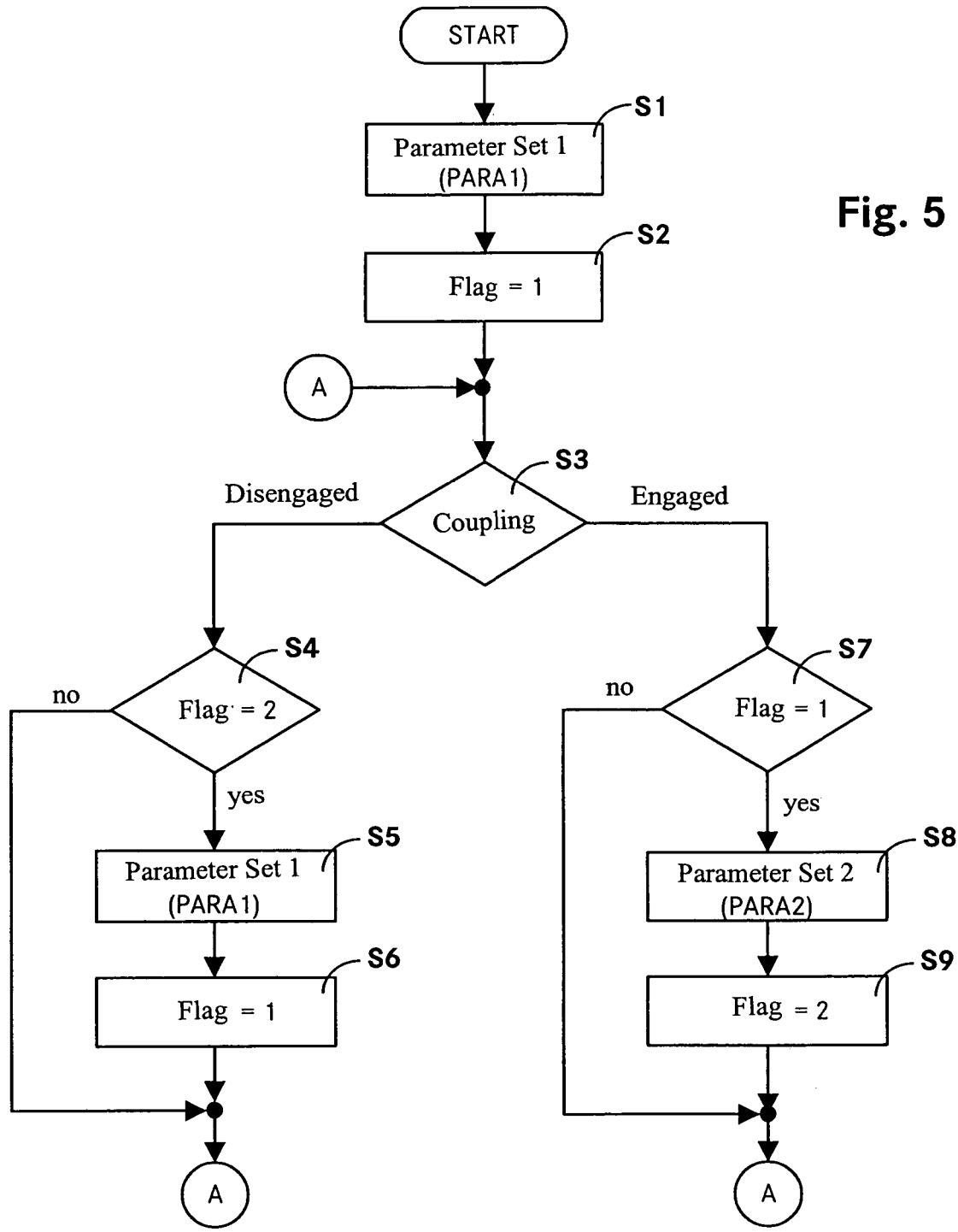
FIG. 5 shows a program flowchart.

FIG. 5 shows a program flowchart of the method. This routine is passed through cyclically. At S1, the first set of parameters PARA 1 is set. A flag is then set to a value of 1 at S2. In an inquiry at S3, a test is performed to determine whether the coupling is disengaged or engaged. If the coupling is disengaged, the program flows to the branch with the steps S4 to S6. If the coupling is engaged, the program flows to the branch with the steps S7 to S9.

If it is detected at S3 that the coupling is still disengaged, then a test is performed at S4 to determine whether the flag has the value 2. If this is not the case, i.e., the flag has the value 1, then the program flows back to program point A. If the flag has a value of 2, i.e., the inquiry at S4 is positive, then at S5 the first set of parameters PARA1 is set, and at S5 the flag is set to a value of 1. The program then flows back to program point A. This routine is thus ended.

If it is detected at S3 that the coupling is engaged, then a test is performed at S7 to determine whether the flag has a value of 1. If this is not the case, then the program flows back to program point A. In the event of a positive test at S7, i.e., the flag has a value of 1, then at S8 the second set of parameters PARA2 is activated. At S9, the flag is set to a value of 2, and the program then flows back to program point A. This routine is thus ended.

The above description reveals the following functional advantages of the invention compared to the state of the art:
 the run-up ramp is switched to a smaller value; this prevents the formation of black smoke;
 the proportional coefficient kp is switched to a larger value to improve the dynamics of the system; the greater the moment of inertia of the system, the larger kp may be without losing stability reserve, since then the damping of the total system also increases;
 the integral-action time TN is switched to a larger value when the coupling engages, which prevents the actual speed from overshooting the rated speed by an unacceptable amount during a load switch; and
 the rate-action time is increased, since the speed gradient is smaller in systems with a larger moment of inertia, and the D component can also be increased by means of a larger Tv.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A method for closed-loop speed control of an internal combustion engine-generator unit with a coupling during a starting operation, comprising the steps of: using a first set of parameters (PARA1) to select a first run-up ramp (HLR1) for the set point assignment of a set speed (nM(SL)); using first controller parameters (TN1, kp1, Tv1) for computing controller components of a speed controller; and, during the starting operation after a start of the first run-up ramp (HLR1), selecting a second set of parameters (PARA2) when it is detected that the coupling has engaged, and deactivating the first set of parameters (PARA1), whereby the second set of parameters (PARA2) is used to set a second run-up ramp (HLR2) which determines the presetting of the set speed (nM(SL)), and to set second controller parameters (TN2, kp2, Tv2) as material for computing controller components of the speed controller.

2. The method in accordance with claim 1, including detecting engagement of the coupling when a coupling signal (SK) is set (SK=1).

3. The method in accordance with claim 1, including detecting engagement of the coupling when, during the starting operation, after the start of the first run-up ramp (HLR1), the gradient (nGRAD) of an engine speed (nMOT) becomes smaller than a limit value (GW) (nGRAD<GW) or a speed control deviation (dR) becomes greater than a limit value (GW) (dR>GW).

4. The method in accordance with claim 2, wherein a smaller speed increase of the set speed (nM(SL)) per unit time is preset by the second run-up ramp (HLR2) than the first run-up ramp (HLR1).

5. The method in accordance with claim 3, wherein a smaller speed increase of the set speed (nM(SL)) per unit time is preset by the second run-up ramp (HLR2) than the first run-up ramp (HLR1).

6. The method in accordance with claim 2, wherein the second set of parameters (PARA2) sets a second proportional coefficient (kp2), a second rate-action time (Tv2), and a second integral-action time (TN2) as controller parameters, which have higher values than the first controller parameters of the first set of parameters (PARA1).

7. The method in accordance with claim 3, wherein the second set of parameters (PARA2) sets a second proportional coefficient (kp2), a second rate-action time (Tv2), and a second integral-action time (TN2) as controller parameters, which have higher values than the first controller parameters of the first set of parameters (PARA1).

8. The method in accordance with claim 1, further including switching back to the first set of parameters (PARA1) when an end condition of the second set of parameters (PARA2) is detected.

9. The method in accordance with claim 8, including detecting the end condition when a shutdown of the internal combustion engine has occurred.

10. The method in accordance with claim 8, including detecting the end condition when a coupling signal (SK) of the coupling is reset (SK=0) or when, after a rated speed (nNN) has been reached, a time interval (t1) has elapsed.

* * * * *